(12) United States Patent
Abe

(10) Patent No.: US 6,493,425 B1
(45) Date of Patent: Dec. 10, 2002

(54) METHOD AND SYSTEM FOR TESTING A NETWORK ELEMENT WITHIN A TELECOMMUNICATIONS NETWORK

(75) Inventor: Robert G. Abe, Irving, TX (US)

(73) Assignee: Verizon Corporate Services Group Inc., Irving, TX (US)

( * ) Notice: Subject to any disclaimer, the term of this patent is extended or adjusted under 35 U.S.C. 154(b) by 0 days.

(21) Appl. No.: 09/150,106

(22) Filed: Sep. 9, 1998

(51) Int. Cl.[7] .............................................. H04M 1/24
(52) U.S. Cl. ..................... 379/1.01; 379/9.01; 379/9.02; 379/15.01
(58) Field of Search ........................... 379/1, 9–10, 14, 379/18, 23, 25, 27, 32, 34, 29.01

(56) References Cited

U.S. PATENT DOCUMENTS

| | | | |
|---|---|---|---|
| 5,359,646 A | | 10/1994 | Johnson et al. ................ 379/27 |
| 5,392,328 A | | 2/1995 | Schmidt et al. ............... 379/10 |
| 5,416,833 A | | 5/1995 | Harper et al. ................ 379/201 |
| 5,461,662 A | * | 10/1995 | Hanai ............................ 379/9 |
| 5,687,212 A | | 11/1997 | Kinser, Jr. et al. ............ 379/10 |
| 5,907,610 A | * | 5/1999 | Onweller .................... 379/242 |
| 5,974,115 A | * | 10/1999 | Chan et al. ................... 379/27 |
| 6,002,746 A | * | 12/1999 | Mulcahy et al. ............... 379/22 |
| 6,148,277 A | * | 11/2000 | Asava et al. .................. 379/10 |
| 6,160,871 A | * | 12/2000 | DuRee et al. .................. 379/9 |

\* cited by examiner

Primary Examiner—Binh Tieu
(74) Attorney, Agent, or Firm—Leonard Charles Suchyta; James K. Weixel

(57) ABSTRACT

Methods and systems consistent with the present invention test a network element in a telecommunications network using a universal command, such as a telephone number or circuit identification number. By doing so, the network element can be easily identified along with the type of service provided by the network element and the appropriate test system can be identified and used without requiring the user to have detailed system-specific knowledge of the test system. Methods and systems consistent with the invention provide an interface to a user. A universal command is received, typically as a telephone number or a circuit identification number. Using the universal command, the type of service associated with the network element is determined and a test system for testing the service type of the network element is identified. A test request is formatted based upon the universal command, the service type to be tested, and the particular test system to be used to test the network element. The test request is then processed within the network, typically by routing the test request to the appropriate test system. In this manner, system-specific commands may be formulated and the appropriate test may be initiated for a network element with test results reported to the user without the need for the user to have pre-existing knowledge of the test system itself.

28 Claims, 5 Drawing Sheets

METHOD AND SYSTEM FOR TESTING A NETWORK ELEMENT WITHIN A TELECOMMUNICATIONS NETWORK

BACKGROUND OF THE INVENTION

A. Field of the Invention

This invention relates to methods and systems for testing elements within a communications network and, more particularly, to methods and systems for testing a network element within a telecommunications network using a universal command and a universal interface.

B. Description of the Related Art

In the telecommunications field, the acronym "POTS" conventionally stands for "plain ordinary telephone service." The POTS network is also referred to as a public switched telephone network (PSTN). The PSTN or POTS network is essentially the standard telephone service that many homes use and is based upon copper wires of a switched network carrying analog voice data.

However, technology in the telecommunications field is moving at a rapid pace. The analog characteristic of the POTS network is giving way to newer and faster digital technologies, such as integrated services digital network (ISDN) and other digital-based telecommunication standards. ISDN is an international communication standard for sending voice, video, and data over digital telephone lines. Using ISDN and other non-POTS services, the functionality and speed of the telecommunications network has been greatly enhanced to meet the needs of increasingly information-hungry telecommunications users and the services for these users.

Additionally, specialized circuits may enhance a telecommunications network with particular or non-standardized functions. Examples of a specialized circuit may include network equipment to support video-on-demand services or support asymmetrically configured data equipment, such as an asymmetrical digital subscriber line (ADSL) modem. As a result, a telecommunications network of today can be a complex conglomeration of different telecommunication services.

When a telecommunications network incorporates diverse technologies, such as POTS and ISDN services, one of the problems faced by a telecommunication service provider is how to efficiently test the telecommunications network. With such diverse technologies within the telecommunications network, the telecommunications service provider typically has multiple test systems connected to the network. These multiple test systems are used by technicians to test and maintain elements, such as switches, subscriber lines, or special circuits, within the network. Typically, each test system has its own functionality, specific commands, and particular syntax for testing a specific type of element or for testing a specific type of service. Additionally, the manner in which a particular test system is accessed and operated may be unique to that particular test system.

In order for a technician to test any element within the network, the technician must be able to successfully operate each test system. It can be costly and undesirably time-intensive to train the technician on each of the different test systems. The technician normally must know which test system to use when testing a particular network element. The technician would also have to know system-specific details, such as the appropriate log-in information and syntax. Furthermore, the technician would have to be versed in all of the test systems in order to interpret the test results from each of the test systems.

One possible way to solve this problem is to maintain manuals and other reference tools for using the test systems where the technician accesses the test systems (i.e., at a workstation or remote laptop). While having reference information quickly available to the technician may be helpful, it still requires laborious training and extensive knowledge in order to understand the particular details of the different test systems. The technician is still not shielded from a required level of infricate knowledge about how to operate each test system.

Furthermore, it is undesirably time-intensive when technicians have to refer to such reference materials when testing elements within the network. The time it takes a technician to troubleshoot and correct a problem in a network element using such materials can become expensive to a telecommunications service provider. The longer it takes a technician to identify the network element, determine the type of service associated with the network element, identify the appropriate test system with which to test the network element, conduct the test and interpret the results, the more costly it is to the telecommunications service provider.

Accordingly, there is a need for a system within a telecommunications network environment that efficiently allows testing of an element of the network without the costs and time associated with training technicians to use and interpret results from each of the

SUMMARY OF THE INVENTION

Methods and systems consistent with the present invention overcome the shortcomings of existing network testing techniques by using a universal command, such as a telephone number or circuit identification number. By doing so, the network element can be easily identified along with the type of service provided by the network element and the appropriate test system can be identified and used without requiring the user to have detailed system-specific knowledge of the test system.

Methods and systems consistent with the invention, as embodied and broadly described herein, describe a method for testing a network element within a telecommunications network. The method begins by receiving a universal command, which identifies the network element. Typically, the universal command is either a telephone number related to a particular network element or a circuit identification number designating information about a particular network element. Next, a test parameter associated with testing the network element is determined based upon the universal command. Typically, determining the test parameter involves determining a service type and identifying a test system associated with the network element. Additionally, a group of test systems may be identified and one of the test systems may then selected as the identified test system.

A test request is then formatted based upon the test parameter for the identified test system. For example, the test request can be formatted to be executable by the identified test system for the determined service type for the network element. The test request includes a specific command for testing the network element. Finally, the test request is processed within the telecommunications network in order to initiate a test on the network element. More particularly stated, processing the test request may include routing the test request to the identified test system so that the identified test system can interpret the test request and execute the specific command for testing the determined service type for the network element.

In accordance with another aspect of the invention, methods and systems, as embodied and broadly described herein, describe another method for testing a network element within a telecommunications network. The method begins by providing an interface through which the network element may be tested by a user. A universal command is received from the user. The universal command identifies the network element to be tested, typically by being in the form of a telephone number or a circuit identification number. A service type associated with the network element is determined based upon the universal command. Next, a test system associated with testing the determined service type is identified. Additionally, a group of test systems associated with testing the determined service type may be identified and one of these test systems may then be selected as the identified test system.

Based upon the determined service type and the identified test system, a test request is formatted to include a specific command for testing the network element. Finally, the test request is processed within the telecommunications network in order to initiate a test on the network element.

In accordance with yet another aspect of the invention, methods and systems, as embodied and broadly described herein describe, a system having a test management processing unit coupled to one or more test systems. The system also has a memory storage device coupled to the test management processing unit. The memory storage device maintains a test management database typically with information on the test systems. The system also includes an input device coupled to the test management processing unit. The input device provides a universal command to the test management processing unit, which can receive the universal command from the input device. Furthermore, the test management processing unit has the capacity to query the test management database in the memory storage device using the universal command in order to determine a service type associated with the network element and identify one of the test systems associated with testing. The test management processing unit also has the capacity to format a test request based upon the service type and the identified test system and route the test request to the identified test system in order to initiate a test on the network element.

BRIEF DESCRIPTION OF THE DRAWINGS

The accompanying drawings, which are incorporated in and constitute a part of this specification, illustrate an implementation of the invention. The drawings and the description serve to explain the advantages and principles of the invention. In the drawings.

DETAILED DESCRIPTION

Reference will now be made in detail to an exemplary implementation consistent with the invention as illustrated in the accompanying drawings. Wherever possible, the same reference numbers will be used throughout the drawings and the following description to refer to the same or like parts.

Introduction

In general, methods and systems consistent with the invention test a network element in a telecommunications network using a universal command, such as a telephone number or circuit identification number. By doing so, the network element can be easily identified along with the type of service provided by the network element. Furthermore, by using the universal command, the appropriate test system can be identified and used without requiring the user to have detailed system-specific knowledge of the test system.

In more detail, an exemplary embodiment consistent with the invention provides an interface to a user or technician as a common point of access to a variety of test systems for testing different types of elements in a telecommunications network. The user enters a universal command into a field of the interface that is then received by a test management software module. The universal command is typically in the form of a telephone number or a circuit identification number. Using the universal command, the test management software module can identify the actual network element, determine the type of service associated with the network element, and identify a test system for testing the service type of the network element. The test management software module accomplishes this by using information stored within a test management database. Next, the test management software typically formats a test request based upon the universal command, the service type to be tested, and the particular test system to be used to test the network element. The test request is then processed within the network, typically by routing the test request to the appropriate test system to initiate the test on the element in the network. In this manner, system-specific commands may be formulated and the appropriate test may be performed on a network element with results reported back to the user without the need for the user to have pre-existing detailed knowledge of the test system itself.

Telecommunications Network Environment

Figure 1:
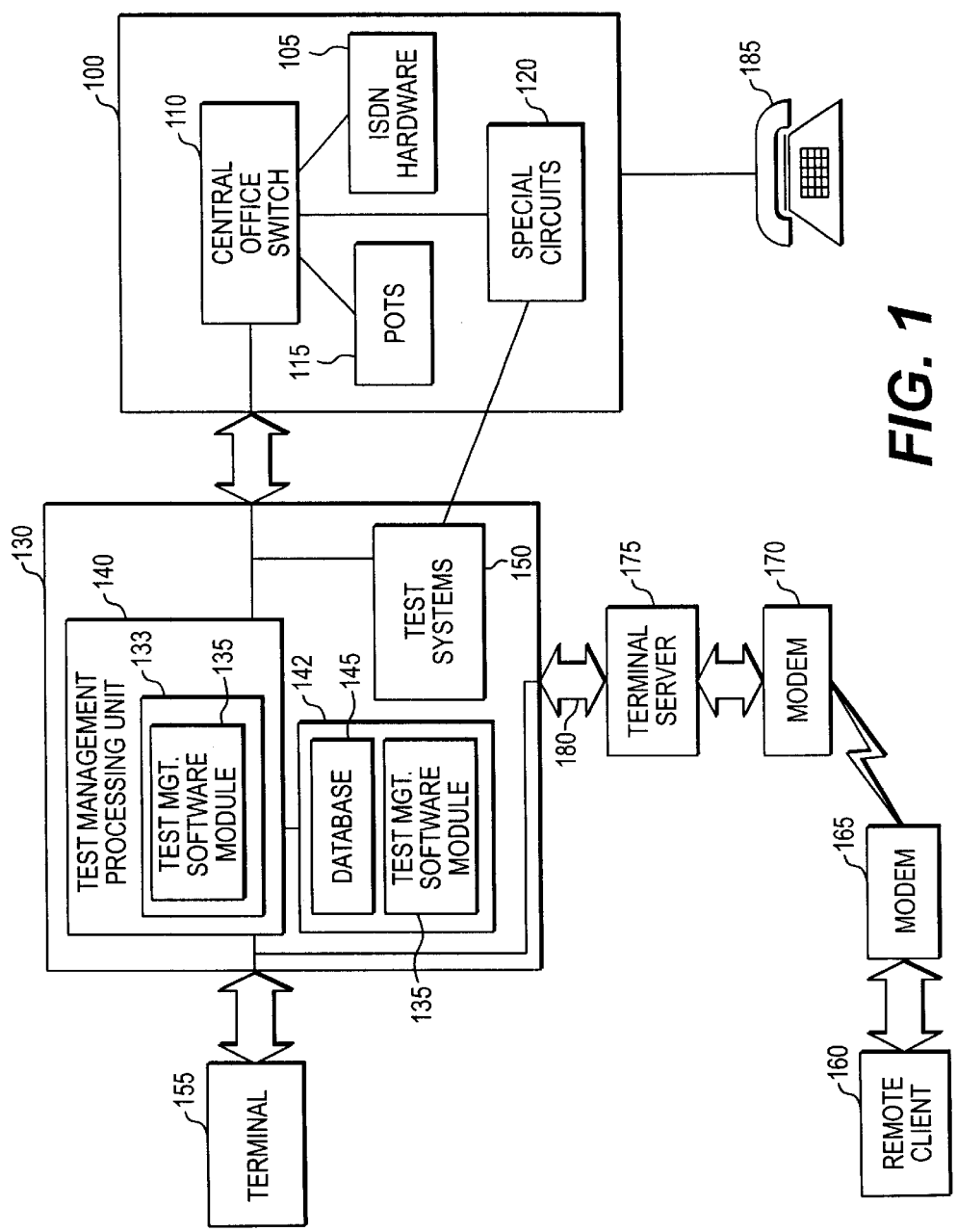
FIG. 1 is a block diagram of an exemplary telecommunications network environment within which the invention may be implemented.

FIG. 1 depicts an exemplary telecommunications network environment suitable for practicing methods and implementing systems consistent with the invention. Referring now to FIG. 1, telecommunications network 100 includes a variety of conventional network elements, such as a central office (CO) switch 110, a POTS network 115, ISDN hardware 105, and special circuits 120. Central office switch 110 is generally defined as a conventional switching office arranged for terminating subscriber lines and providing switching equipment and trunks for establishing connections to and from other switching offices or network elements. POTS network 115 is a conventional part of telecommunications network 100 providing basic analog voice service. ISDN hardware 105 is generally defined as telecommunications network equipment providing integrated voice, circuit-switched data and packet-switched data services over standard subscriber lines. Finally, special circuits 120 are generally defined to be customized circuits or network elements that provide dedicated facilities for non-POTS services. Examples of special circuits include, but are not limited to, interexchange carrier access circuits and off-premise extension circuits. In summary, the network elements in telecommunications network 100 are conventional devices or elements capable of being tested using test systems 150 connected to telecommunications network 100.

Elements in telecommunications network 100 are typically tested when the telecommunications service provider is performing routine maintenance, checking system performance, or when a problem becomes apparent or is reported to the telecommunications service provider. In such a situation where one or more elements are to be tested, service modules 130 are usually accessed by a technician (more generally referred to as a user) to troubleshoot the problem. Service modules 130 are essentially a group of hardware and software tools utilized by the telecommunication service provider and its technicians (e.g., the users) to maintain and diagnose problems with network elements in telecommunications network 100. In an exemplary embodiment, service modules 130 include one or more conventional test systems 150 for testing different types of network elements. Test systems 150 are typically commercially available test systems for testing and diagnosing problems with telecommunication switches and other equipment. Due to differences in telecommunication standards and technologies, it is likely that test systems 150 has different test systems for particular types of network elements in order to test the different services provided by the network elements.

Service modules 130 also include a test management processing unit 140 coupled to a memory storage device, such as disk drive 142, which maintains software modules, such as a test management software module 135 and a test management database 145. Generally stated, test management processing unit 140 is capable of managing the testing process so that the user does not have to be aware of any system-specific commands. When troubleshooting a problem, the user initiates a test of a network element using an input device to access test management processing unit 140. Typically, the input device is either a local terminal 155 (such as a Model VT-100 Terminal Interface Unit manufactured by Digital Equipment Corporation of Waltham, Mass.) on-site at the telecommunications service provider's facility or a remote client 160 (such as a conventional laptop computer or portable computer configured as a terminal). Using terminal 155, the user may connect to test management processing unit 140 in order to begin testing of telecommunications network 100. However, if the user is in a remote location, the user may connect to test management processing unit 140 using the remote client 160 configured as a remote terminal. As a remote terminal, the remote client 160 is connected to test management processing unit 140 by a conventional remote access system. For example, connectivity can be accomplished via a remote modem 165 connected to another modem 170 and then to a terminal server 175. Essentially, terminal server 175 provides remote access capability via modem 170 and a connection 180 (typically a conventional X.25 wide area network or a conventional transfer control protocol/internet protocol (TCP/IP) network) to test management processing unit 140.

Once a connection is made to test management processing unit 140, the user is provided with an interface and is able to enter a universal command, such as a telephone number or circuit identification number, through a uniform, functional interface in order to identify the network element to be tested. The rest of the testing process is advantageously simplified for the user because, based upon the universal command, the element's type of service is determined, an appropriate test system is identified, a test request is formatted and routed to the appropriate test system, and the results can be interpreted and provided back to the user. In the exemplary embodiment, the test request is preferably routed via a conventional TCP/IP network between test management processing unit 140 and test systems 150. Those skilled in the art will recognize that TCP/IP is a standard communications protocol built into UNIX operating systems and useful for communicating between two computers.

In this manner, network elements, such as central office switch 110 or special circuits 120, can be easily tested by the appropriate one of test systems 150 without requiring the user to know any system-specific log-in information or understand how to interpret the raw system-specific test results. While FIG. 1 illustrates network elements as being separate from test systems 150, it is contemplated that test systems 150 may be part of one or more network elements within network 100.

In more detail, test management processing unit 140 is essentially a processing device (such as a conventional computer, microprocessor, microcontroller, or other type of logic device). Test management processing unit 140 is typically capable of receiving the universal command identifying one of the network elements, running other test systems (such as test systems 150) to test the identified network element, and providing the test results through an interface to the user. In an exemplary embodiment consistent with the invention, test management processing unit 140 is implemented with a multi-processor computer, preferably an RS-6000 Model R-30 manufactured by International Business Machines (IBM) Corporation of Armonk, N.Y. The test management processing unit 140 preferably runs a UNIX operating system such as AIX Version 4.1.4. marketed and distributed by IBM.

Once the operating system is booted and loaded into system memory 133 of test management processing unit 140, test management processing unit 140 typically loads test management software module 135 from disk drive 142 into system memory 133 in order to perform the above-described functions. In an exemplary embodiment, test management software module 135 is a software application written in the C++ and JAVA computer programming languages. Furthermore, in the exemplary embodiment, test management software module 135 can include a library of software providing programmatic access to a set of asynchronous application services related to testing network elements. Test management software module 135 accesses this library of services through an application programming interface (API). Those skilled in the art will be familiar with APIs, the C++ and JAVA programming languages, and the availability of numerous technical references on object-oriented programming with the C++ and JAVA programming languages.

When executing test management software module 135, test management processing unit 140 uses test management database 145 for information required during testing of a network element. Essentially, test management database 145 includes information on the identity of each of the network elements and includes test system-specific information on log-in and specific commands. In the exemplary embodiment consistent with the invention, test management database 145 is implemented using an INFORMIX Version 7.1 database developed and marketed by Informix, Corporation of Menlo Park, Calif. Thus, in the exemplary embodiment, the combination of test management processing unit 140, test management software 135, and test management database 145 essentially provides the capability of testing a network element without requiring the user to have specific knowledge of which test system to use, details on the network element, and how to interpret results from the test.

One skilled in the art will appreciate that all or part of systems and methods consistent with the invention may be stored on or read from disk drive 142 or other computerreadable media (such as secondary storage devices like hard disks, floppy disks, and CD-ROM), a carrier wave received from the Internet, or other forms of ROM or RAM. Finally, although specific components of test management processing unit 140 have been described, one skilled in the art will appreciate that a processing system suitable for use with the exemplary embodiment may contain additional or different components, such as a single processor and a variety of input/output devices.

User Interface When Testing Network Element

Figure 2:
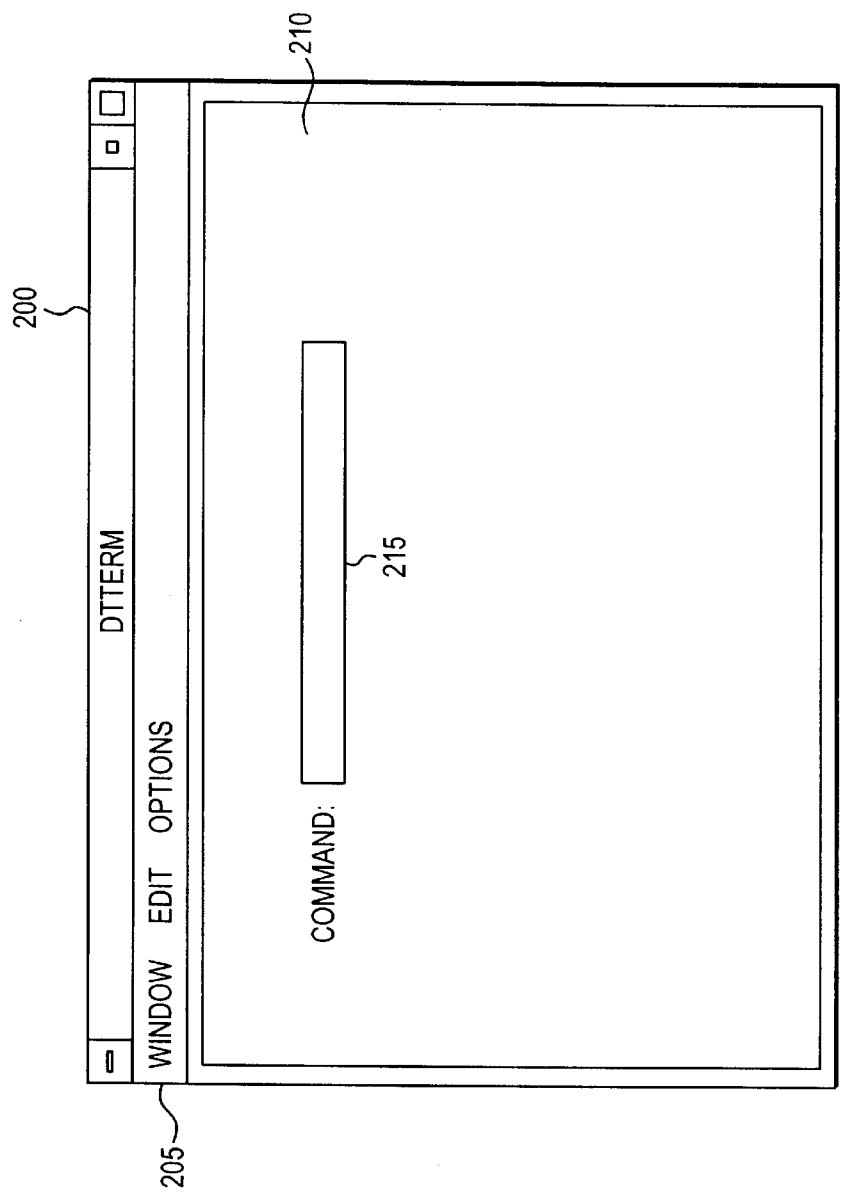
FIG. 2 is an exemplary illustration of an interface used for entering a universal command when testing a network element consistent with an exemplary embodiment of the invention.
Figure 3A:
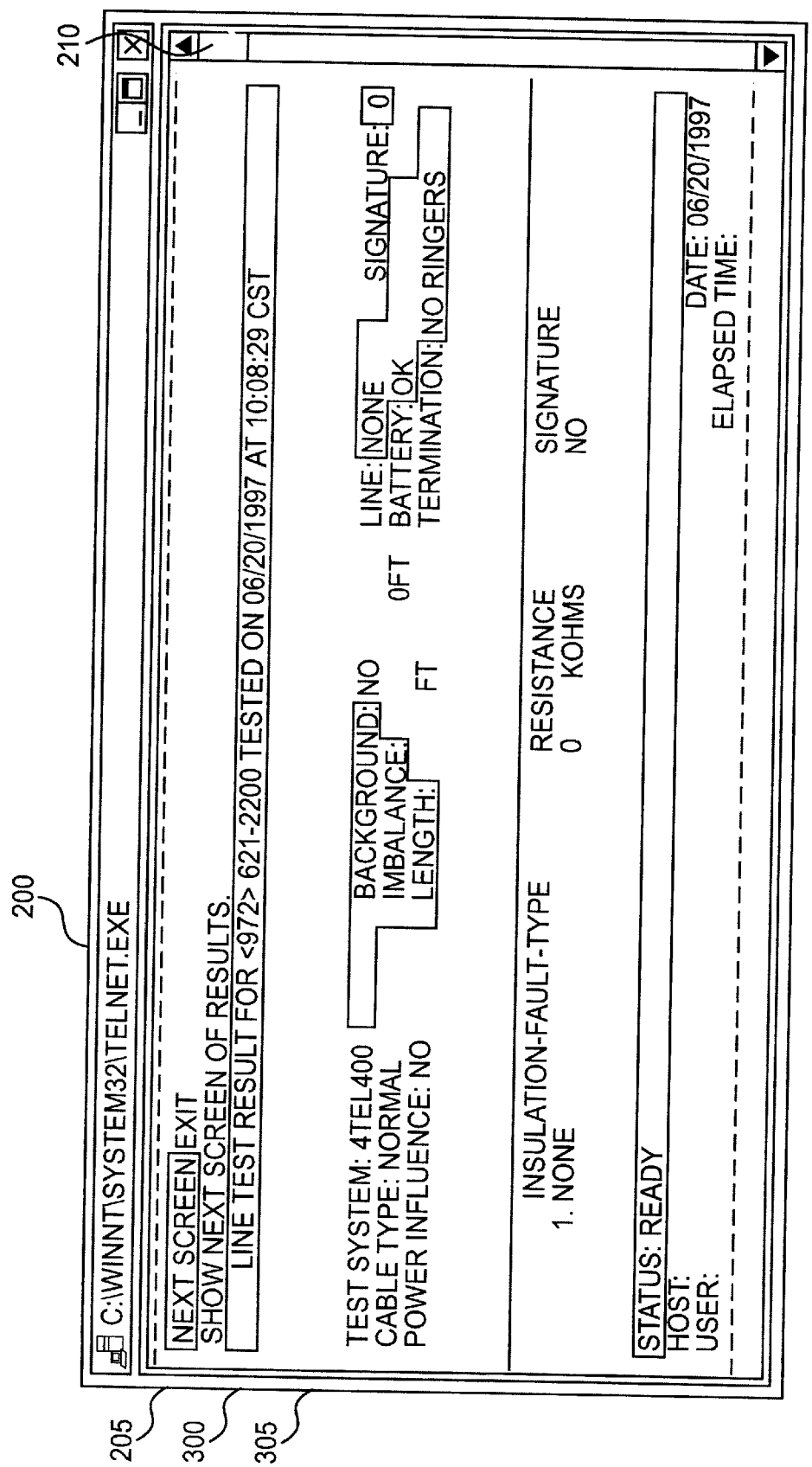
FIGS. 3A and 3B are exemplary illustrations of an interface used for providing test results to a user when testing a network element consistent with an exemplary embodiment of the invention.
Figure 3B:
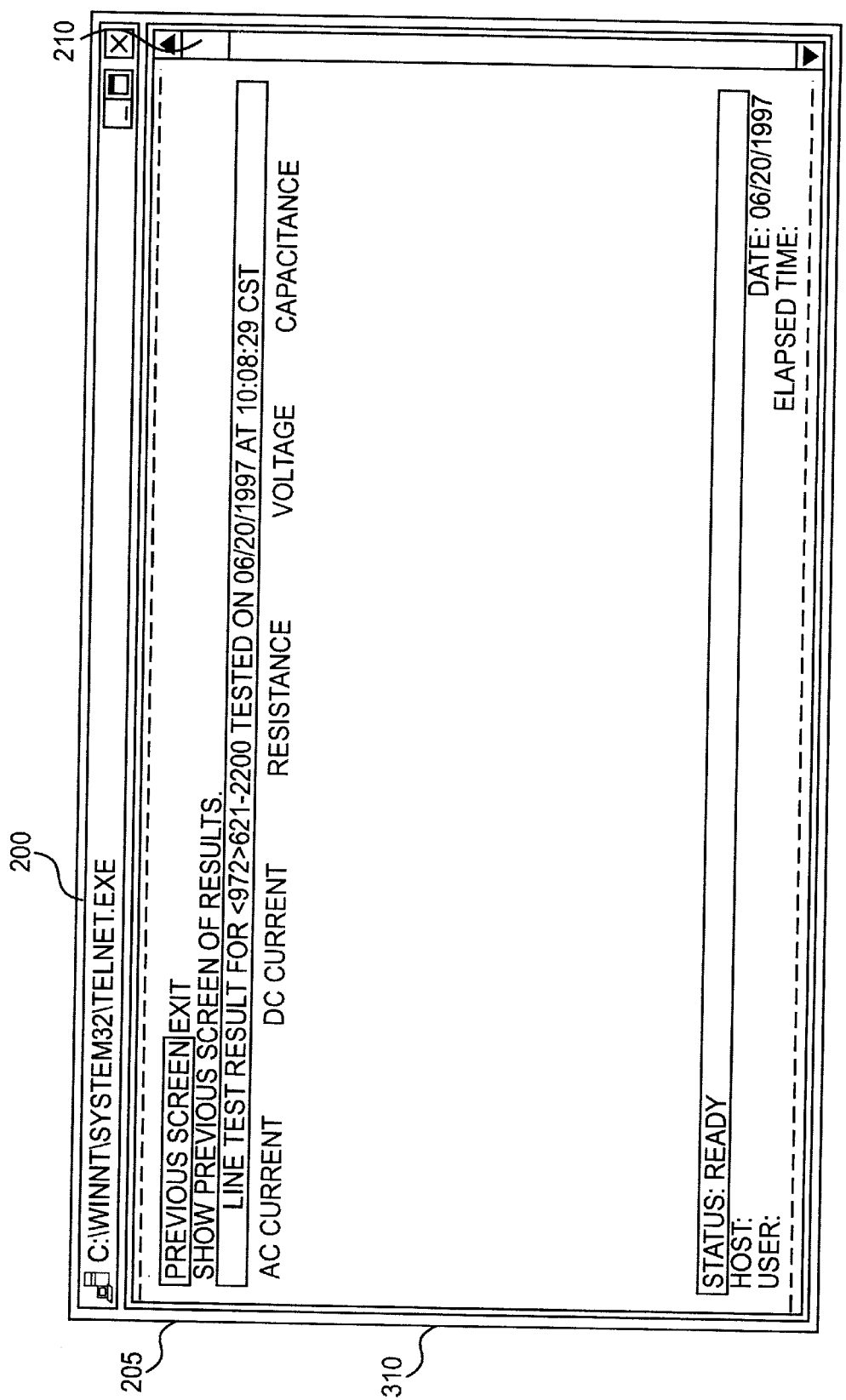

In the context of the above-described telecommunications network environment, FIGS. 2, 3A, and 3B illustrate exemplary interfaces appearing on the relevant input device (i.e., terminal 155 or remote client 160) from a user's perspective. The exemplary interfaces are generated by test management processing unit 140 when executing test management software module 135 to test elements within telecommunications network 100. FIG. 2 illustrates what the user sees in an exemplary embodiment when attempting to initiate a test on a network element by entering a universal command. FIGS. 3A and 3B illustrate what the user sees in an exemplary embodiment when test results are provided from test systems 150 by test management software module 140.

Referring now to FIGS. 1 and 2, a computer-generated window 200 is illustrated having a menu bar 205 and a user interface area 210. Window 200 and everything displayed within window 200 is provided by test management processing unit 140. More particularly stated, window 200 is provided by test management processing unit 140 when executing test management software module 135 and when connected to one of the input devices (e.g, terminal 155 or remote client 160). In such a configuration, the input device is a client and logs into test management processing unit 140 running test management software module 135 as a server.

Within user interface area 210 is a field 215 for inputting or entering a universal command. When a user desires to test a network element, such as a switch or a subscribers telephone line within POTS 115, ISDN hardware 105, or special circuits 120, the user enters a universal command in field 215 of interface 210. The universal command is received by test management processing unit 140, which then causes the testing process to begin. A universal command is generally defined to be any type of reference to a specific network element within telecommunications network. In the exemplary embodiment, a universal command is typically either a telephone number or a circuit identification number, each of which identify the network element to be tested. A telephone number (also know as a directory number) conforms to a standard format, such as a ten digit format for telephone numbers. For example, a telephone number may be entered as a universal command in the following format:

NPANXXXXXXX or (NPA) NXX-XXXX where NPA represents a three-digit numbering plan that identifies a designated geographical area, NXX represents a three-digit code that designates a central switching office, and XXXX represents a four-digit code that designates a station or subscriber line number.

A circuit identification number is generally defined as a reference or alphanumeric sequence of characters that is associated with and helps to identify a network element in telecommunications network 100. In the exemplary embodiment, a circuit identification number is typically a sequence of up to 22 alphanumeric characters in an industry standard Common Language Line Identification (CLLI) code format. In the CLLI code format, the sequence of characters typically consists of a prefix, a service code, a modifier, a serial number, a suffix, and a company code or segment ID. Those skilled in the art will be familiar with CLLI code format for identifying and referring to elements within a telecommunications network, such as telecommunications network 100.

Once the user enters the universal command on field 215, the universal command is sent from the input device (e.g., terminal 155 or remote client 160) to test management processing unit 140. Next, one or more test parameters are determined that are associated with the network element. Test parameters are broadly defined as specific details regarding how the network element is to be tested, such as a service type associated with the network element or an appropriate test system associated with testing the service type of the network element.

In more detail, test management processing unit 140 determines the service type associated with the network element identified by the universal command. Typically, if the universal command is a telephone number, the service type is POTS testing or ISDN testing. However, if the universal command is a circuit identification number, then the type of service associated with the identified network element is known to be special circuit testing.

Furthermore, test management processing unit 140 is able to identify the appropriate test system with which to test the network element. Identifying the appropriate test system depends upon the type of service and the identity of the network element. For example, Table 1 below illustrates how an appropriate test system can be identified in an exemplary embodiment consistent with the invention based on the type of service needed (i.e., the type of testing required), which is determined from the universal command.

TABLE 1

| Universal Command | Service Type | Possible Test Systems |
|---|---|---|
| Telephone Number (only CO exchange) | POTS CO Testing | CENTRAL SWITCHING SYSTEM (C.O.) |
| Telephone Number (whole number) | POTS Line Testing | 4TEL 365 4TEL 400 MAP MCS RTEC |
| Telephone Number | ISDN Testing | DSTS |
| Circuit ID Number | Special Circuits Testing | ESARTS REACT SCSFI |

In the example illustrated in Table 1, there are a variety of different test systems listed for particular types of services. A Switch Access Module (SAM) is the gateway to the Central Office Switching System, which is used to conduct POTS CO Testing within the CO. The Central Office Switching system and its SAM gateway are developed by GTE Telephone Operations of Irving, Texas. SAM is offered commercially under the brand name GTE ACCESS GUARDIAN.

When a telecommunication service provider's customer calls and reports some kind of problem with his or her traditional residential or business telephone line, typically a system capable of testing POTS lines is the appropriate test system. Examples of such systems include a Model 4TEL 365 Tester and a Model 4TEL 400 Tester manufactured by Teradyne of Boston, Mass.; a Maintenance Access Port (MAP) on a Model DMS100/200 Switch manufactured by Northern Telecom of Richardson, Tex.; a test system called MCS manufactured by Micro Computer Systems of Irving, Tex.; and a test system known as RTEC manufactured by Reliance Technology of Silver Spring, Md.

When testing ISDN hardware 105, the test system must be able to test ISDN features at the particular data rates called for under the ISDN standard. An example of an appropriate test system for ISDN testing is Digital Services Test System (DSTS) manufactured by GTE Laboratories of Waltham, Mass.

When testing special circuits 120, the appropriate test system must be able to test the particular features of special circuits 120 in the network 100. Examples of an appropriate test system for special circuit testing include the Enhanced Special Services Remote Test System (ESARTS) manufactured by Lucent Technologies of Murray Hill, N.J.; a test system called REACT manufactured by Hekimian of Rockville, Md.; and a test system called Special Circuits Fault Isolation System (SCFI). As previously mentioned, the invention contemplates that the appropriate test system for testing a network element, such as special circuits 120, may be a separate test system capable of communicating with the network element (special circuits 120) or a test system incorporated into the network element (special circuits 120).

While there are instances where more than one test system is listed above in Table 1 for a particular type of service, the invention contemplates identifying one or more test systems suitable for testing the network element. The user simply selects among those appropriate test systems for testing the type of service associated with the network element. For example, for POTS line testing, after the user inputs the telephone number into remote client 160, for example, and the number appears in field 215 of FIG. 2, test management processing unit 140 identifies the various, appropriate test systems to the user by opening a window (not illustrated) in window 200 from which the user can choose the test system desired.

Once the network element has been identified, the type of service has been determined, and the appropriate test system has been identified, a test request specific to the appropriate test system is formatted by test management processing unit 140. The test request includes a specific command to be executed by the appropriate test system. The test request is formatted by referring to information contained within the test management database 145. Thus, the test request has routing information and the specific command for the appropriate test system. Those skilled in the art will realize that the format of the test request will vary depending upon the particular test system targeted as the appropriate test system, the method of communicating between test management processing unit 140 and test systems 150, and where the particular test system is located relative to test management processing unit 140.

Test management processing unit 140 then processes the test request typically by routing the test request to the appropriate test system, which subsequently executes the specific command to initiate the test. During processing of the test request, test management processing unit 140 typically displays test status information (such as "Accessing Test Device" or "Testing" or "Analyzing") to the user. In this manner, testing of a problematic network element can be accomplished in a central and much easier way than previously possible.

FIGS. 3A and 3B are illustrations of an interface generated by test management software module 135 when providing test results back to a user consistent with an exemplary embodiment of the invention. Referring now to FIGS. 1, 2, 3A and 3B, interface 210 is illustrated in window 200 with fields of summarized test results 305 and a listing of parametric test result data 310 compiled from raw test data sent from the appropriate test system. For example, fields of summarized test results 305 may include, but are not limited to, a field listing the test system used, a field for a dispatch message from the test system to the user, and a field indicating the test systems analysis of background noise in the network element as illustrated in FIG. 3A. Such fields provide an easily understood version of the raw test data. Furthermore, the listing of parametric test result data 310 may also include, but is not limited to, AC current levels, DC current levels, resistance levels, voltages levels and capacitance levels related to the network element as illustrated in FIG. 3B.

Processing and interpreting of the raw test data into test results 305 and test results data 310 provided to the user are typically accomplished by test management software module 135. In the exemplary embodiment, test management software module 135 receives raw data from the appropriate test system. Test management software module 135 then calls parts of the associated library of services through the library's API in order to interpret and compile the raw data into a summarized and easily understandable format. More particularly stated, test management software module 135 calls particular methods defined within classes of objects in the library of services. The methods are used by test management software module 135 to compile the raw test data and manipulate the data in a predetermined manner to provide useful and understandable summary information about the tested network element. For example, in the exemplary embodiment, a method called POTSTestSession in a library called libpots.a can be called by test management software module 135 to provide details of a test on a POTS network element, such as a switch or subscriber telephone line in POTS 115. The test details may include line voltage readings, current readings, termination analysis, as well as information on the length of the line or conditions of the line's insulation.

Although not shown, test results from a previous period of time related to the same network element can also be viewed at interface 210 in an exemplary embodiment consistent with the invention. Essentially, test management processing unit 140 stores test results from previous tests on the same or same class of network element. Test management processing unit 140 is able to provide test results for a network element within a previous period of time, as a history for a particular network element, and for the most recent test performed on the network element. In this manner, later test results can be compared to earlier test results for improved analysis and an enhanced diagnostic and troubleshooting capability within the system.

In summary, the user is able to enter a universal command through a user interface and cause a network element associated with the universal command to be tested for particular telecommunications services by an appropriate test system without requiring the user to have system-specific knowledge of the element or test system.

Figure 4:
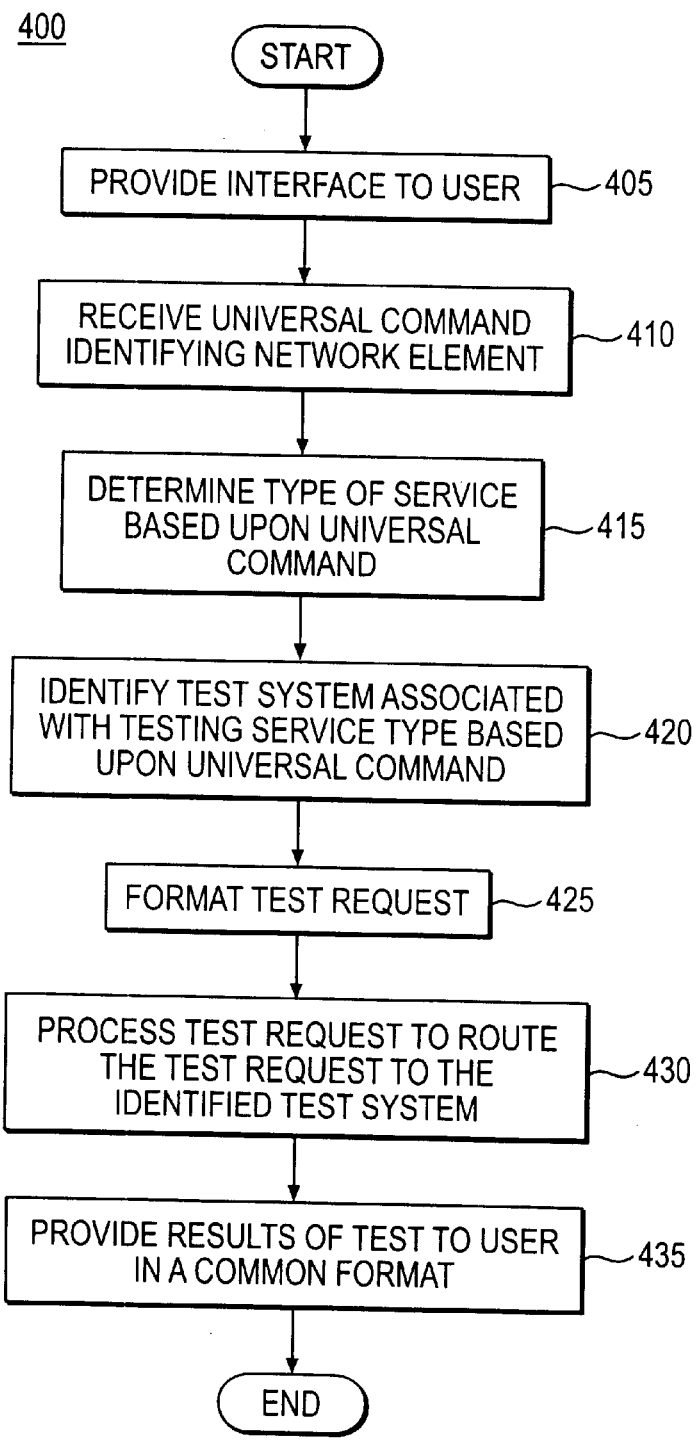
FIG. 4 is a flow chart illustrating typical steps for testing a network element within a telecommunications network consistent with an exemplary embodiment of the invention.

Further details on steps of an exemplary method in accordance with the invention for testing a network element using a universal command will now be explained with reference to the flow chart of FIG. 4. Referring now to FIGS. 1–4, the method 400 begins at step 405 where an interface, such as interface 210, is provided to a user. Typically, this is accomplished by connecting to test management processing unit 140 as a remote terminal using an input device (such as terminal 155 or remote client 160). Terminal emulation software on the input device enables the user to log into test management software module 135 running as a server within test management processing unit 140. In response to the user's log-in connection, test management software module 135 provides interface 210 as a functional interface to the user for interacting with test systems 150 connected to network 100.

At step 410, a universal command is received identifying the network element to be tested. In the exemplary embodiment, the universal command is, as discussed above, typically either a telephone number or a circuit identification number. Each of these universal commands generally refers to and identifies one of the network elements within telecommunications network 100.

Essentially, steps 415 and 420 determine a test parameter associated with testing the network element based upon the received universal command. More particularly stated, a type of service is determined based upon the value of the universal command at step 415. At step 420, a test system is identified that is associated with testing the type of service. The test system is identified based upon the value of the universal command. As previously mentioned, if more than one test system are identified based on the value of the universal command, then one of the tests systems out of such a group may then be selected as the identified test system.

At step 425, a test request is formatted. In general, the test request is formatted with a specific command capable of being used to test the network element. In the exemplary embodiment, the test request is formatted by test management software module 135 using information in the test management database 145. This information provides system-specific details on how to communicate with and programmatically operate test systems 150. In this manner, test management software module 135 is able to format the test request to include a specific command for the appropriate test system and routing instructions to send the specific command to the appropriate test system.

At step 430, the test request is processed, typically by test management software module 135, to route the test request to the test system identified in step 420 as the appropriate test system. In the exemplary embodiment, the test request is preferably routed via a conventional transfer control protocol/internet protocol (TCP/IP) network between test management processing unit 140 and test systems 150. Those skilled in the art will recognize that TCP/IP is a standard communications protocol built into UNIX operating systems and useful for communicating between two computers.

Once the test request is processed in step 430, the appropriate test system receives the test request (having the specific command for testing the identified network element) and performs the test on the network element. The test system generates results of the test and sends the results to test management software module 135 in response to receiving the test request.

Finally, at step 435, results of the test are provided to the user in a common format. Providing such test results in the common format allows the user to easily understand the test results without the need for prior knowledge of the test system used. In the exemplary embodiment, test management software module 135 compiles the raw test data sent from the test system and summarizes the raw test data into test results displayed within fields 305, 310 on interface area 210.

CONCLUSION

Methods and systems consistent with the invention test a network element in a telecommunications network by receiving a universal command identifying the network element, determining a test parameter (such as the type of service to be tested and an appropriate test system) associated with the network element, formatting a test request with a specific command for testing the network element and processing the test request to cause the network element to be tested. One of the advantages to testing a network element in this manner is that specific knowledge and details about the network element and the test system need not be known by the user. Furthermore, methods and systems consistent with the invention advantageously eliminate the need for users to understand the raw data produced by the test systems.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the invention may be implemented as a combination of hardware and software or in hardware alone. The invention may be implemented with both object-oriented and non-object-oriented programming systems. Thus, the scope of the invention is defined by the claims and their equivalents.

What is claimed is:

1. A method for testing a network element within a telecommunications network, comprising the steps of:

receiving a universal command identifying the network element from an input device;

determining, without receiving information from a user in addition to the universal command, a test parameter associated with testing the network element based upon the universal command;

identifying a test system associated with testing the network element based upon the universal command;

formatting a test request based upon the test parameter; and processing the test request within the telecommunications network in order to initiate a test by the test system on the network element.

2. The method of claim 1, wherein the receiving step further comprises receiving a telephone number as the universal command which identifies the network element.

3. The method of claim 1, wherein the receiving step further comprises receiving a circuit identification number as the universal command which identifies the network element.

4. The method of claim 1, wherein the determining step further comprises determining a service type associated with the network element based upon the universal command.

5. The method of claim 4 further comprising, after the determining step, identifying a test system associated with testing the network element based upon the universal command.

6. The method of claim 4 further comprising, after the determining step, identifying a plurality of test systems associated with testing the network element based upon the universal command and selecting one of the test systems as an identified test system for testing the network element.

7. The method of claim 5, wherein the formatting step further comprises formatting the test request to be executable by the identified test system for the determined service type for the network element.

8. The method of claim 7, wherein the processing step further comprises routing the test request to the identified test system so that the identified test system can interpret the test request and execute the specific command for testing the determined service type for the network element.

9. The method of claim 1 further comprising providing results of the test.

10. The method of claim 9 further comprising interpreting raw data from the test and providing summarized results of the test.

11. A method for testing a network element within a telecommunications network, comprising the steps of:
providing, at an input device, an interface through which the network element may be tested by a user;
receiving a universal command identifying the network element from the input device, the universal command identifying the network element to be tested;
determining, without receiving information from a user in addition to the universal command, a service type associated with testing the network element based upon the universal command;
identifying a test system associated with testing the determined service type based upon the universal command;
formatting a test request based upon the determined service type and the identified test system; and
processing the test request within the telecommunications network in order to initiate a test by the test system on the network element.

12. The method of claim 11, wherein the receiving step further comprises receiving a telephone number as the universal command which identifies the network element.

13. The method of claim 12, wherein the determining step further comprises determining the service type to be POTS testing if the universal command is the telephone number.

14. The method of claim 11, wherein the receiving step further comprises receiving a circuit identification number as the universal command which identifies the network element.

15. The method of claim 14, wherein the determining step further comprises determining the service type to be a customized type of circuit testing on the network element if the universal command is the circuit identification number.

16. The method of claim 11, wherein the identifying step further comprises identifying a plurality of compatible test systems associated with testing the network element based upon the universal command and selecting the test system from the compatible test systems as an identified test system for testing the network element.

17. The method of claim 11, wherein the formatting step further comprises formatting the test request to include a specific command that is executable by the identified test system for the determined service type on the network element.

18. The method of claim 17, wherein the processing step further comprises routing the test request to the identified test system so that the identified test system can interpret the test request and execute the specific command for testing the determined service type for the network element.

19. The method of claim 11 further comprising providing results of the test to the user.

20. The method of claim 19 further comprising interpreting raw data from the test and providing summarized results of the test to the user.

21. A system for testing a network element within a telecommunications network, comprising:
a test management processing unit coupled to a plurality of test systems;
a memory storage device coupled to the test management processing unit, the memory storage device maintaining a test management database;
an input device coupled to the test management processing unit, the input device providing a universal command to the test management processing unit; and
the test management processing unit being operative to receive the universal command from the input device, query the test management database in the memory storage device using the universal command in order to determine, without receiving information from a user in addition to the universal command, a service type associated with the network element and identify one of the test systems associated with testing, format a test request based upon the service type and the one of the test systems, and
route the test request to the one of the test systems in order to initiate a test on the network element.

22. The system of claim 21, wherein the input device is further capable of providing a telephone number as the universal command, the telephone number being associated with the network element.

23. The system of claim 21, wherein the input device is further capable of providing a circuit identification number as the universal command, the circuit identification number being associated with the network element.

24. The system of claim 21, wherein the test management processing unit is further operative to format the test request to include a specific command capable of being interpreted and executed by the one of the test systems in order to test the service type of the network element.

25. The system of claim 21, wherein the test management processing unit is further operative to receive results of the test from the one of the test systems, compile the results into a summary and to provide the summary to the input device.

26. A method for testing a network element within a telecommunications network, comprising the steps of:
receiving, from an input device, a universal command identifying a network element associated with a subscriber line to be tested;
determining a test parameter associated with testing the network element based upon the universal command;
identifying a test system associated with testing the network element based upon the universal command;
formatting a test request based upon the test parameter; and
processing the test request within the telecommunications network in order to initiate a test by the test system on the network element.

27. A method for testing a network element within a telecommunications network, comprising the steps of:
receiving, from an input device, a universal command identifying a network element associated with a subscriber line to be tested;
determining a service type associated with testing the network element based upon the universal command;
identifying a test system associated with testing the determined service type based upon the universal command;
formatting a test request based upon the determined service type and the identified test system; and
processing the test request within the telecommunications network in order to initiate a test by the test system on the network element.

28. A system for testing a network element within a telecommunications network, comprising:
a test management processing unit coupled to a plurality of test systems;
a memory storage device coupled to the test management processing unit, the memory storage device maintaining a test management database;

an input device coupled to the test management processing unit, the input device providing, to the test management processing unit, a universal command identifying a network element associated with a subscriber loop to be tested; and the test management processing unit being operative to receive the universal command from the input device, query the test management database in the memory storage device using the universal command in order to determine a service type associated with the network element and identify one of the test systems associated with testing, format a test request based upon the service type and the one of the test systems, and route the test request to the one of the test systems in order to initiate a test on the network element.

\* \* \* \* \*